Inventor:
Claude B. Schneible,
By Dyrenforth, Lee, Chritton & Wiles
Attys

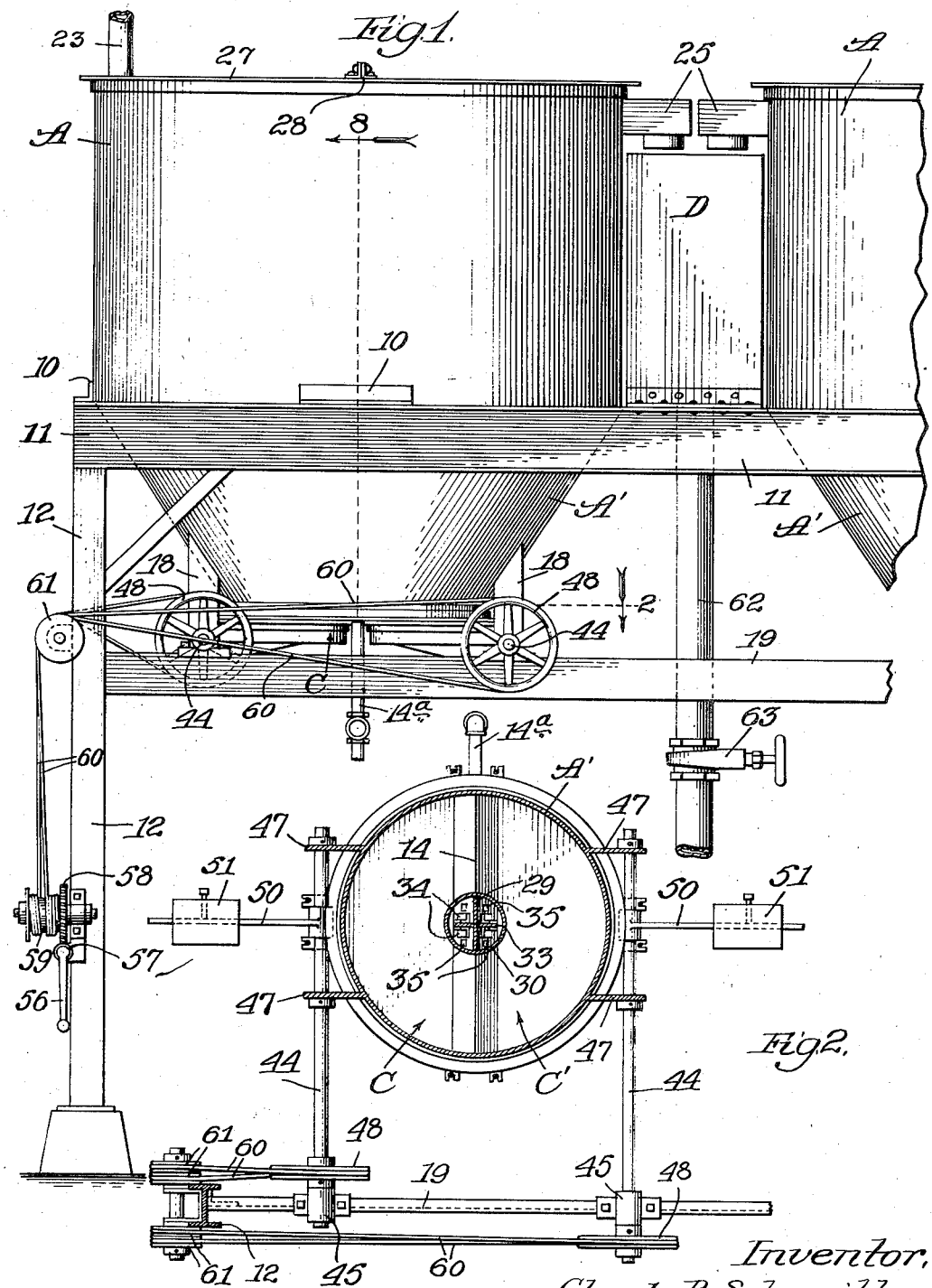
April 13, 1937.  C. B. SCHNEIBLE  2,077,074
SEPARATOR APPARATUS
Filed Aug. 30, 1935  4 Sheets-Sheet 1
Inventor:
Claude B. Schneible April 13, 1937. C. B. SCHNEIBLE 2,077,074
SEPARATOR APPARATUS
Filed Aug. 30, 1935 4 Sheets-Sheet 2

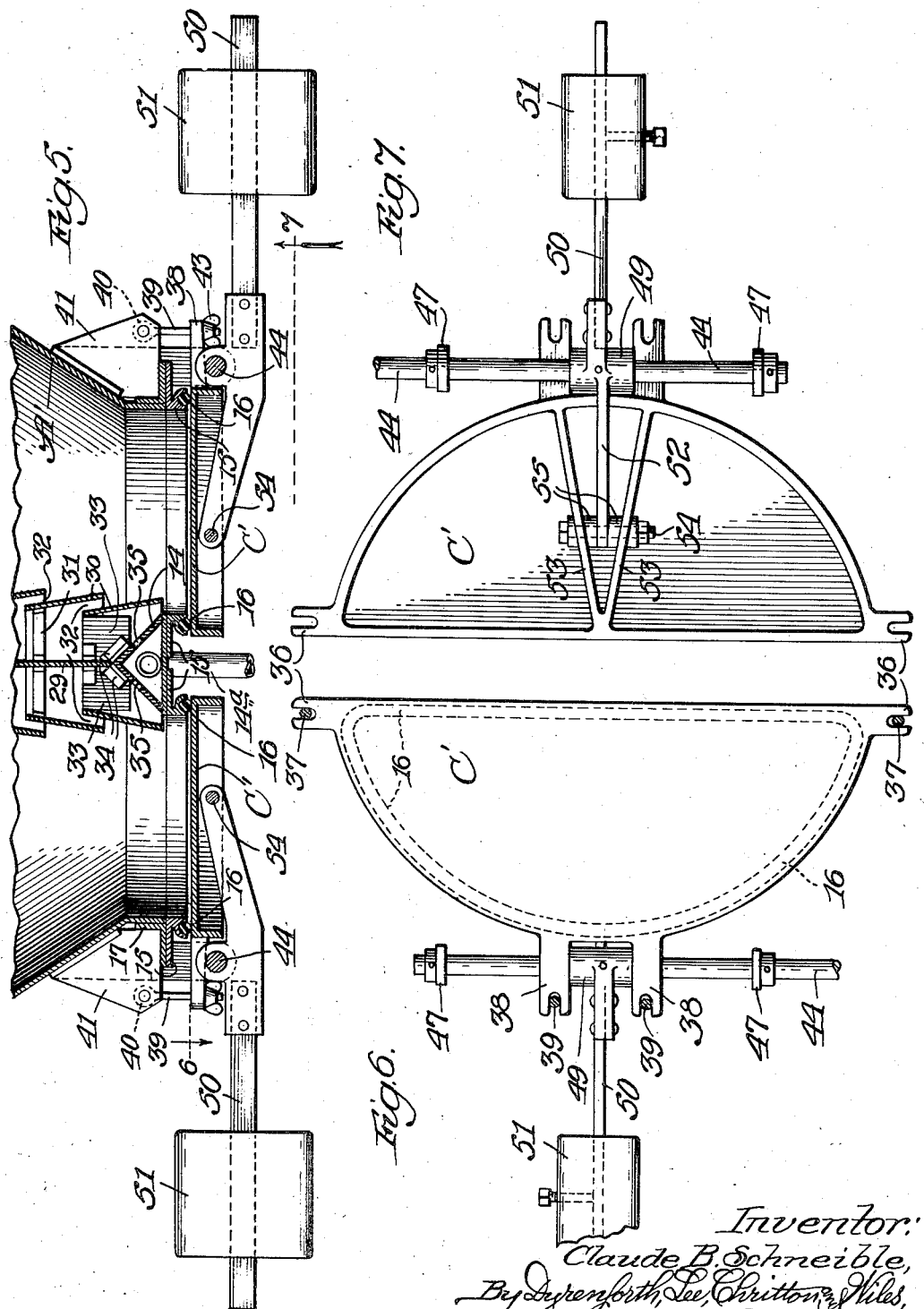

April 13, 1937. C. B. SCHNEIBLE 2,077,074
SEPARATOR APPARATUS
Filed Aug. 30, 1935 4 Sheets-Sheet 4

Inventor:
Claude B. Schneible,
By Dyrenforth, Lee, Chritton & Wiles,
Attys.

Patented Apr. 13, 1937

2,077,074

UNITED STATES PATENT OFFICE 2,077,074

SEPARATOR APPARATUS

Claude B. Schneible, Chicago, Ill.

Application August 30, 1935, Serial No. 38,635

13 Claims. (Cl. 210—51)

This invention relates to separator apparatus and more particularly to apparatus for separating foreign matter carried in suspension in a liquid from the liquid itself.

An object of the invention is to provide effective apparatus for removing solids carried in suspension in a liquid and separately recovering the liquid and solid material. Other specific objects and advantages will appear as the specification proceeds.

The invention is illustrated, in a preferred embodiment, by the accompanying drawings, in which—

Figure 3:
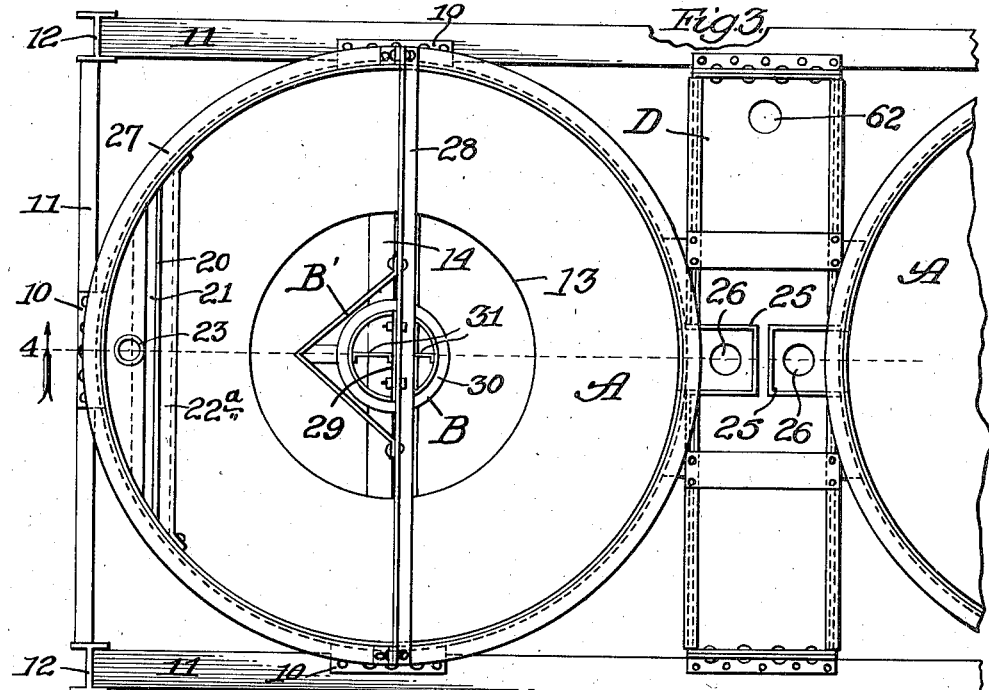
Figure 4:
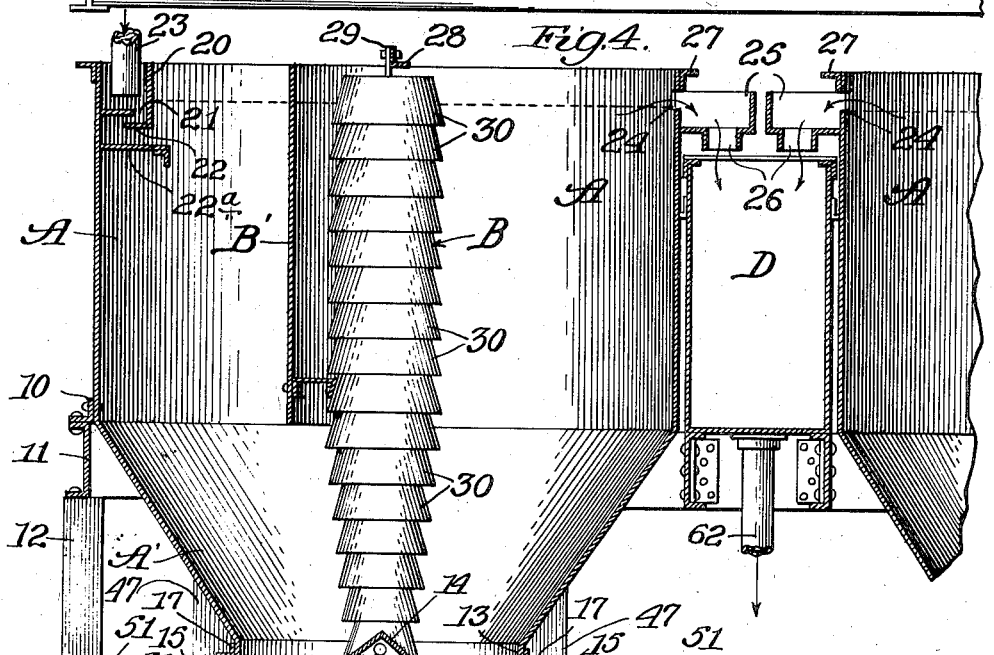
Figure 8:
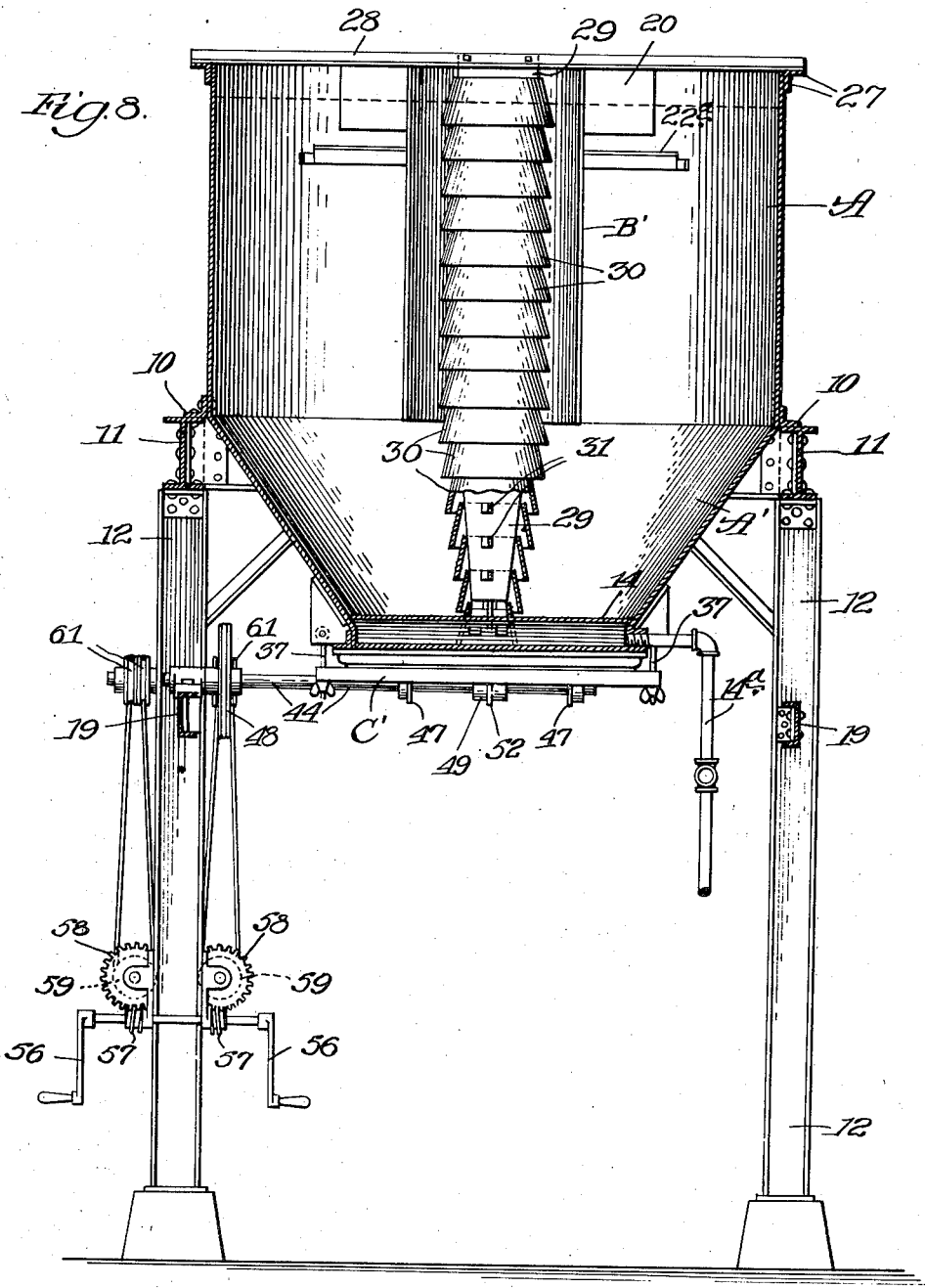

Figure 1 is a side view in elevation, the second tank being shown broken away; Fig. 2, a plan sectional view, the section being taken as indicated at line 2 of Fig. 1; Fig. 3, a top plan view; Fig. 4, a vertical sectional view, the section being taken as indicated at line 4 of Fig. 3; Fig. 5, an enlarged detail sectional view showing the lower portion of the tank; Fig. 6, a detail view taken as indicated at line 6 of Fig. 5; Fig. 7, a bottom plan view taken as indicated at line 7 of Fig. 5; and Fig. 8, a vertical sectional view, the section being taken as indicated at line 8 of Fig. 1.

The apparatus consists broadly of a pair of tanks with an overflow liquid-receiving tank therebetween, each of the tanks being provided centrally with a removable baffle tower which aids in the separation of the solids from the liquid. Each of the tanks is also provided with a frusto-conical bottom and with swing gates which may be operated to discharge the solid material gathering in the lower part of each tank. Only one of the tanks is shown in full detail because the two tanks are identical in construction.

In the illustration given, A designates the two tanks, each being provided with a frusto-conical bottom A'; B designates the removable baffle tower; C designates the closure mechanism at the base of each tank; and D designates the liquid outlet or overflow tank between the two tanks A.

Referring to the tank A which is shown completely in the drawings, it may be of any suitable form or construction. In the illustration given, the tank A is provided with an angle iron support 10 on one side, which in turn is carried by the U-beam 11 resting upon the standard 12. The lower portion of tank A is frusto-conical in shape and is provided near its lower end with a tubular portion 13.

The triangular pipe 14 extends across the lower portion of tank A adjacent the tubular portion 13. Below the pipe 14 and the tubular tank section 13 is a pair of frame members 15 which are substantially semi-circular in shape. Each of the members 15 partially encloses on its under side a resilient sealing ring 16 of rubber or other suitable material. An angle iron 17 extends about a portion of the tank A and its flanges may be spot-welded to the tubular portion 13 of the tank and to a portion of the frame member 15 to secure the frame member to the portion 13 of the tank. Likewise, the straight portion of the frame or ring 15 may be spot-welded or otherwise secured to the bottom wall of the triangular pipe 14. The two frame members 15 thus encompass all the open space in the bottom of the tank on either side of the triangular pipe 14 and provide sealing connections for the gate mechanism C.

The frusto-conical portion A' of the tank may additionally be supported by short standards 18 which rest upon the cross-beam 19 carried by a plurality of standards 12.

At its upper side, each of the tanks A is provided with an inlet box 20 having its bottom apertured at 21 and having a depending deflector 22 which directs the incoming liquid toward the wall of tank A. An inlet pipe 23 may extend into box 20. Below deflector 22 is a second deflector 22$^a$ which causes the incoming liquid to move slowly in the direction of the large angular baffle B' which is supported on the inlet side of tower B. Diametrically opposed to the inlet box 20 is an outlet opening 24 in each tank A, the bottom wall of the opening 22 providing a weir for outlet box 25. The liquid in box 25 flows downwardly through the outlet neck 26 into the liquid overflow pipe D which is supported between the two tanks A. Liquid within the triangular pipe 14 in the bottom of casing A is drained through valved outlet pipe 14$^a$. Each tank A is provided near its top with an angle iron affording a horizontal flange 27. Bolted to flange 27 and extending diametrically across the top of the tank is an angle iron support 28. To the vertical flange of angle iron 28 and near its center is bolted a vertically extending plate 29. Plate 29 provides the main support for the baffle tower B as will be later described.

The baffle plate tower B may be of any suitable construction. In the illustration given, I provide a series of baffles 30 which have conical or inclined sides and which are of varying diameters. Each of the plates or sleeves 30 is supported by U-shaped supports 31 having their inner end flanges welded to plate 29 and their outer end flanges welded to the sleeves or baffle plates 30. The baffles are so shaped and positioned as to provide between them narrow and upwardly extending inlet passages 32 which lead from the exterior to the interior of the tower, as shown more clearly in Fig. 5.

In the lowermost baffle sleeve, there is secured a pair of plates 33 on opposite sides of the vertical plate 29 and spot-welded thereto by means of angle irons. The inner corner portions of the plates 33 are cut away and the plates 32 are provided adjacent said cut-away portions with angle irons 34 which provide angular supporting faces adapted to engage the pointed top of the pipe 17. Thus the weight of the tower is distributed over the surface of the pointed pipe 14 by means of the supports 34.

The pipe 14 is preferably provided with openings 35 below the angle members 34.

Turning now to the closure mechanism C and the parts associated therewith, it will be noted from Fig. 6 that the semi-circular gates C' are each provided near their forward side with laterally extending ears 36 which are slotted to receive tightening bolts 37. At their rear sides, each member C' is provided with rearwardly extending arms 38 which are slotted at their ends to receive tightening bolts 39. The bolts 39, as shown more clearly in Fig. 5, are provided at their upper ends with eyes 40 secured to supporting plates 41. The plates 41 rest their lower ends upon flanges 17 which in turn rest upon a flange of the frame member 15. The lower ends of bolts 39 are threaded to receive wing nuts 43.

There are two actuating shafts 44 on opposite sides of the tank A. The shafts are supported at one end in journals 45 supported by a frame member 19. Plates 47, which are similar to supporting plates 41, provide additional journals for shafts 44. Each of the shafts 44 is provided with a plate 48 which is driven by means which will be described hereinafter. Pinned to each shaft 44 is a collar 49 provided with a rearwardly extending arm 50 equipped with a weight 51. Integrally formed with collar 49 is a forwardly extending arm 52 which is connected to the bottom of each gate C' in the manner shown more clearly in Fig. 7. The bottom of the gate C' is provided with integral diverging ribs 53 and between the ribs extends a bolt 54 which extends through a perforated end of arm 52. The arm 52 is centrally spaced on bolt 54 by means of washers 55.

Any suitable means for driving the pulleys 48 may be employed. In the illustration given, I have provided a crank arm 56 rotating a worm gear 57. The worm gear 57 meshes with a gear 58 fixed to the drum 59. A cable 60 has its ends secured to opposite sides of said drum 59 and the remainder of the cable passes over the double pulley 61 with the loop end of the cable extending about the pulley 48. The worm gear 57 preferably is employed to drive two gears 58 and two drums 59, each of the drums being employed to drive through its cable connections one of the pulleys 48. By this means, rotation of the crank arm 56 causes the two shafts 44 to rotate simultaneously.

The overflow tank D may be of any suitable construction. In the illustration given, the tank D is supported in the space between the two tanks A and directly below the overflow box 25. The bottom of the tank is provided with a liquid draw-off pipe 62 which is provided with a control valve 63.

Operation

In the operation of the apparatus, the liquid containing solids in suspension is introduced into one tank A through inlet pipe 23. The liquid is directed toward the outer wall of the tank by deflector 22 to break the force of the incoming stream. Deflector 22ᵃ then causes the liquid to move quietly and slowly toward the large V-shaped baffle B' which extends about the half of tower A toward the inlet pipe 23. The heavier particles in the liquid tend to drop toward the bottom of the tank C within the conical portion A'. The clarified overflow passes out through weir 24 and outlet pipe 26 into the receiving tank D. Just below the liquid inlet, the body of liquid forms a quiescent zone in which the heavy material settles down outside of and without entering the narrow passages 32 formed by baffle plates 30 of baffle tower B.

After the operation has proceeded as above described for some time and a substantial amount of heavy material has settled out, I close the valve (not shown) controlling inlet pipe 23 and direct the flow of the liquid into the inlet pipe in the other tank A. The valve controlling pipe 14ᵃ leading from the triangular pipe 14 in the bottom of the first tank A is then opened slightly to permit the flow of the clear liquid within tower B, this liquid being clarified and adapted for re-use. The liquid within tower B flows through openings 35 at the base of the tower and in the top of the triangular pipe 14 into pipe 14ᵃ until the clear liquid is exhausted. At the same time, the level of the liquid outside of tank B gradually drops until there is left in the bottom of the tank the heavy foreign material which it is desired to remove, the angle of repose of the settled material preventing it from being carried out through passages 32 with the receding liquid.

In order to remove the heavy material in the bottom of tank B, I first remove the wing nuts upon the bolts 37 and 39 to free the gates. One of the crank arms 56 is then manipulated to rotate pulleys 48, thereby causing rotation of shafts 44. Shafts 44 cause arms 52 to move downwardly and the gates C' are thus lowered. Upon the dropping of the gates, the sludge or heavy material which has been separated to a large extent from the liquid drops through the openings below tower B. A truck, railway car, or other suitable conveyance may be placed below the gate C' prior to the dropping of the gates in order to receive the matter discharged.

As already mentioned, while the first tank A is being discharged, the liquid to be treated is diverted to the other tank A. In this manner, a stream of liquid can be continuously subjected to the separation process. It will be understood, however, that if desired, the two tanks may be operated simultaneously.

After the first tank A has been cleaned, crank arm 56 is then manipulated to rotate pulleys 48 and shafts 44 in the opposite direction and the actuating arms 52 raise the gates C' to the position shown in Fig. 5. The wing nuts 43 are then secured to the threaded ends of bolts 39 so as to tightly press the gates C' against the sealing ring 16. The tank is now ready to receive liquid to be treated.

If it is desired to clean the tower B, the tower may be removed by removing the bolts connecting plates 28 and 29. The tower may then be lifted out of the tank. When the tower is replaced, the lowermost baffle 30, which has a triangular portion thereof cut away, will straddle pipe 14 and serve to center the tower within tank A.

Heretofore, it has been common to employ rectangular tanks in bringing about a separation of solids from liquids. In my improved apparatus, the tank is preferably circular and the tower B is centrally located therein. With this construction, all of the material being treated is held closely around the tower B, and a uniform treating of the material results. All of the material by reason of its proximity to tower B is subjected to the dewatering operation and a sludge of substantially uniform consistency is obtained.

While in the foregoing description, I have set forth in detail the construction of the apparatus used, it will be understood that many changes may be made in the details of construction without departing from the spirit of my invention. Also, many variations may be made in the operation of the process for treating different materials.

The foregoing detailed description has been given for clearness of understanding only, and no unnecessary limitations should be understood therefrom, but the appended claims should be construed as broadly as permissible, in view of the prior art.

I claim:

1. In apparatus of the character set forth, a tank having an open bottom, a removable closure for said bottom, a baffle tower supported in said tank and comprising nested sleeves affording narrow upwardly directed passages leading into said tower, and inlet and outlet connections in the upper portion of said tank, said tower having an outlet to the exterior of said tank.

2. In apparatus of the character set forth, a tank having a frusto-conical bottom, a removable closure for said bottom, a baffle tower supported in said tank and providing narrow channels leading from the exterior thereof upwardly into the interior thereof, said tower being equipped with deflectors overhanging the entrance to said channel, inlet and outlet passages communicating with the upper portion of said tank, and an outlet conduit communicating with the interior of said tower.

3. In apparatus of the character set forth, a tank provided with an inlet and an outlet, a pipe extending into the bottom portion of said tank, a baffle tower supported above said pipe, said tower comprising nested sleeves affording narrow upwardly directed passages leading into said tower, and said pipe having at least an opening communicating with the bottom portion of said tower.

4. In apparatus of the character set forth, a tank, a triangular pipe extending across the bottom portion of said tank and having upwardly extending pointed walls, a baffle tower having its lower portion equipped with a plate apertured to engage the pointed walls of said conduit, said tower comprising nested sleeves affording narrow upwardly directed passages leading into said tower, said conduit having at least one opening communicating with the bottom of said tower, and inlet and outlet passages communicating with the upper portion of said tank.

5. In apparatus of the character set forth, a tank having a frusto-conical lower portion, a conduit extending across the lower portion of said tank, closure members hingedly supported and adapted to close the space on opposite sides of said conduit, and means for simultaneously moving said closure members.

6. In apparatus of the character set forth, a tank having an open bottom, a conduit extending thereacross, a baffle tower removably supported in said tank and resting on said conduit, said tower comprising nested sleeves affording narrow upwardly directed passages leading into said tower, inlet and outlet pipes communicating with the upper portion of said tank, an outlet conduit communicating with said tower, and movably mounted closure members adapted to engage the lower portion of said tank and said conduit to seal the bottom of said tank.

7. In apparatus of the character set forth, a tank having an open bottom, a conduit extending across said open bottom, a pair of hinged closures supported adjacent the bottom of said tank and engaging said conduit so as to provide therewith a seal for the bottom of the tank, clamping means for moving said closure members into tight engagement with said tank and conduit, means for moving said closure members when said clamping members are released, a baffle tower supported centrally within said tank and above said conduit, and an overflow pipe communicating with the upper portion of said tank.

8. In apparatus of the character set forth, a tank, a conduit in the lower portion thereof provided with an opening, a baffle tower supported in said tank above said opening, said tower comprising nested sleeves affording narrow upwardly directed passages leading into said tower, an inlet pipe on one side of said tank, an outlet conduit communicating with said tower, a baffle deflector for directing liquid from said pipe slowly toward the opposite side of said tank, an overflow pipe on the opposite side of said tank provided with a weir, and a receiving tank supported below said overflow tank.

9. In apparatus of the character set forth, a tank, a conduit in the lower portion thereof provided with an opening, a baffle tower supported in said tank and having its lower portion communicating with said opening, said tower comprising nested sleeves affording narrow upwardly directed passages leading into said tower, an inlet pipe on one side of said tank, baffle means for directing liquid from said pipe slowly toward the opposite side of said tank, a baffle shield extending about the portion of the baffle tower facing said inlet pipe, and an overflow on the opposite side of said tank.

10. In apparatus of the character set forth, a tank having a frusto-conical lower portion, a conduit extending across the lower portion of said tank, closure means movably supported and adapted to close the space on opposite sides of said conduit, and means for opening and closing said closure means.

11. In apparatus of the character set forth, a tank having an inlet and outlet, a baffle tower comprising a series of baffles disposed one above another and affording between them narrow upwardly directed passages leading from said tank into the interior of said tower, and an outlet conduit communicating with the interior of said baffle tower.

12. In apparatus of the character set forth, a tank having an inlet and outlet in the top portion thereof, a baffle tower comprising a series of baffles supported one above the other in said tank, and affording a passage-way on the interior of the tower, said baffles being spaced apart to afford between them narrow upwardly directed passages leading from said tank into said internal passage-way, and an outlet conduit communicating with said interior passage-way of said tower.

13. A settling apparatus including a tank having an inlet thereto and an outlet therefrom, both said inlet and said outlet being arranged adjacent the top of the tank, and including means supported within the tank adapted to withdraw liquid from the tank at a number of different levels, wherein the liquid withdrawal means is in the form of a plurality of nested sleeves defining narrow upwardly directed passages.

CLAUDE B. SCHNEIBLE.